United States Patent
Wang et al.

(10) Patent No.: US 6,762,716 B2
(45) Date of Patent: Jul. 13, 2004

(54) DIGITAL BEACON ASYMMETRY AND QUANTIZATION COMPENSATION

(75) Inventors: Hanching G. Wang, Hacienda Heights, CA (US); Chih-Chien Hsu, Cherry Hill, NJ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/319,273

(22) Filed: Dec. 13, 2002

(65) Prior Publication Data

US 2004/0113838 A1 Jun. 17, 2004

(51) Int. Cl.[7] .............................................. H04B 7/185

(52) U.S. Cl. ....................... 342/358; 342/354; 342/359; 342/385

(58) Field of Search ................................ 342/358, 354, 342/359, 385

(56) References Cited

U.S. PATENT DOCUMENTS 5,936,570 A * 8/1999 Ghazvinian et al. ........ 342/354

* cited by examiner

*Primary Examiner*—Stephen C. Buczinski
(74) *Attorney, Agent, or Firm*—Gates & Cooper LLP

(57) ABSTRACT

A method, apparatus for reducing errors in a plurality of beacon beams is disclosed. The method comprises the steps of computing quantized channel weights $\tilde{W}_c$ from channel weights $W_c$ for at least some of the channels; estimating the quantization error $\Delta B_a$ for each of the beacon beams from a difference between the channel weights $W_c$ and the computed quantized channel weights $\tilde{W}_c$; and adding the estimated quantization error $\Delta B_a$ to the beacon beams. Similarly, a beacon biases equivalent to the beacon asymmetry error can be computed by the ground beacon beam forming software and uploaded to the on-board software for error compensation. The apparatus comprises one or more means, such as a processor communicatively coupled to a memory storing instructions for performing these operations.

26 Claims, 8 Drawing Sheets

DIGITAL BEACON ASYMMETRY AND QUANTIZATION COMPENSATION

BACKGROUND OF THE INVENTION

1. Field of the Invention

The present invention relates to systems and methods for satellite navigation, and particular to a system and method for reducing error from beacon measurements used or satellite navigation.

2. Description of the Related Art

Spacecraft typically have one or more payloads that are directed to transmit or receive energy from ground stations. For example, communication satellites include one or more uplink antennae for receiving information from an uplink center, and one or more downlink antennae for transmitting information to a terrestrial receiver. The uplink and downlink antennae are typically disposed on the satellite body (or spacecraft bus) and are directed toward a terrestrial location where an uplink/downlink antenna is transmitting/receiving the information.

In many cases, the information is beamed to a plurality of terrestrial receivers spanning a wide geographical area. In such situations, the pointing accuracy of the uplink/downlink antennae is not particularly critical. However, in other cases, spacecraft payloads must be pointed at the desired target with a high degree of accuracy. This can be the case, for example, in cases where the uplink/downlink antenna is a narrow beamwidth antenna, or when spatial diversity is critical. In such situations, spacecraft's on-board navigation system (which relies on inertial sensors and perhaps sun, earth, and magnetic sensors as well) often cannot support the precise pointing requirement.

In such cases, beacon sensor systems can be used to increase payload pointing performance and spacecraft body control. The beacon sensor monitors an uplink carrier (which can also be used to provide commands to the satellite) to sense mispointing of the antenna structure. Using the beacon sensor data as a reference, the satellite navigational system parameters can be updated to improve accuracy. In particular, the beacon sensor data can be used to replace earth sensor data.

Recent technology advancement leads to the realization of digital beacons. In a digital beacon, the beacon beams are formed digitally using an on-board Digital Signal Processor (DSP). The beams are formed by selecting desired beam weights for each feed chain. However, the accuracy of the digital beacons are negatively affected by the performance limitations of the digital beam-forming technique and its implementation. Although some digital beacon sensor errors can be ameliorated by calibration and the adjustment of weighting to beacon sensor channels, asymmetry errors due to beam-forming approximation by finite number of feed chains, and quantization errors due to the finite-bit representation of the weighting factors themselves can severely impact beacon accuracy and therefore payload pointing accuracy. What is needed is a system and method for compensating for such asymmetry error and quantization errors. The present invention satisfies this need.

SUMMARY OF THE INVENTION

To address the requirements described above, the present invention discloses a method, apparatus for reducing errors in a plurality of beacon beams, and aggregate errors in a digital beacon. The method comprises the steps of computing quantized channel weights $\tilde{W}_c$ from channel weights $W_c$ for at least some of the channels; estimating the quantization error $\Delta B_a$ for each of the beacon beams from a difference between the channel weights $W_c$ and the computed quantized channel weights $\tilde{W}_c$; and adding the estimated quantization error $\Delta B_a$ to the beacon beams. Similarly, beacon biases equivalent to the beacon asymmetry error can be computed by the ground beacon beam forming software and uploaded to the on-board software for error compensation. In one embodiment, the apparatus comprises one or more means, such as a processor, communicatively coupled to a memory storing instructions for performing these operations.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
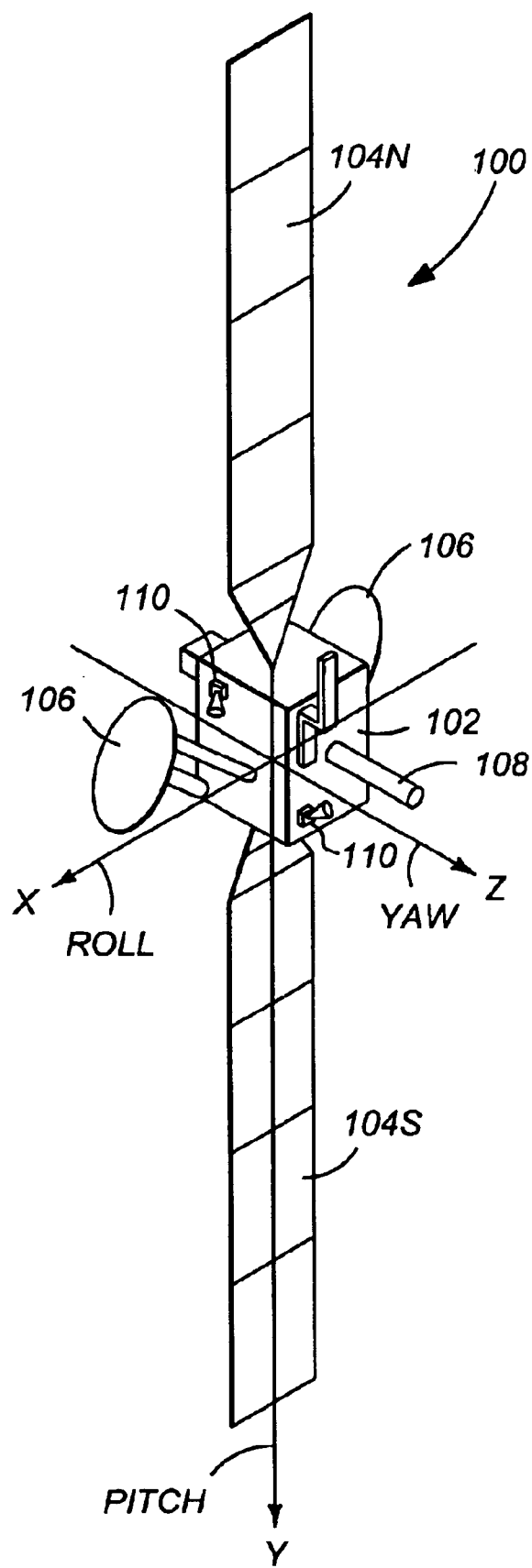
FIG. 1 is a diagram of a satellite.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 10 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
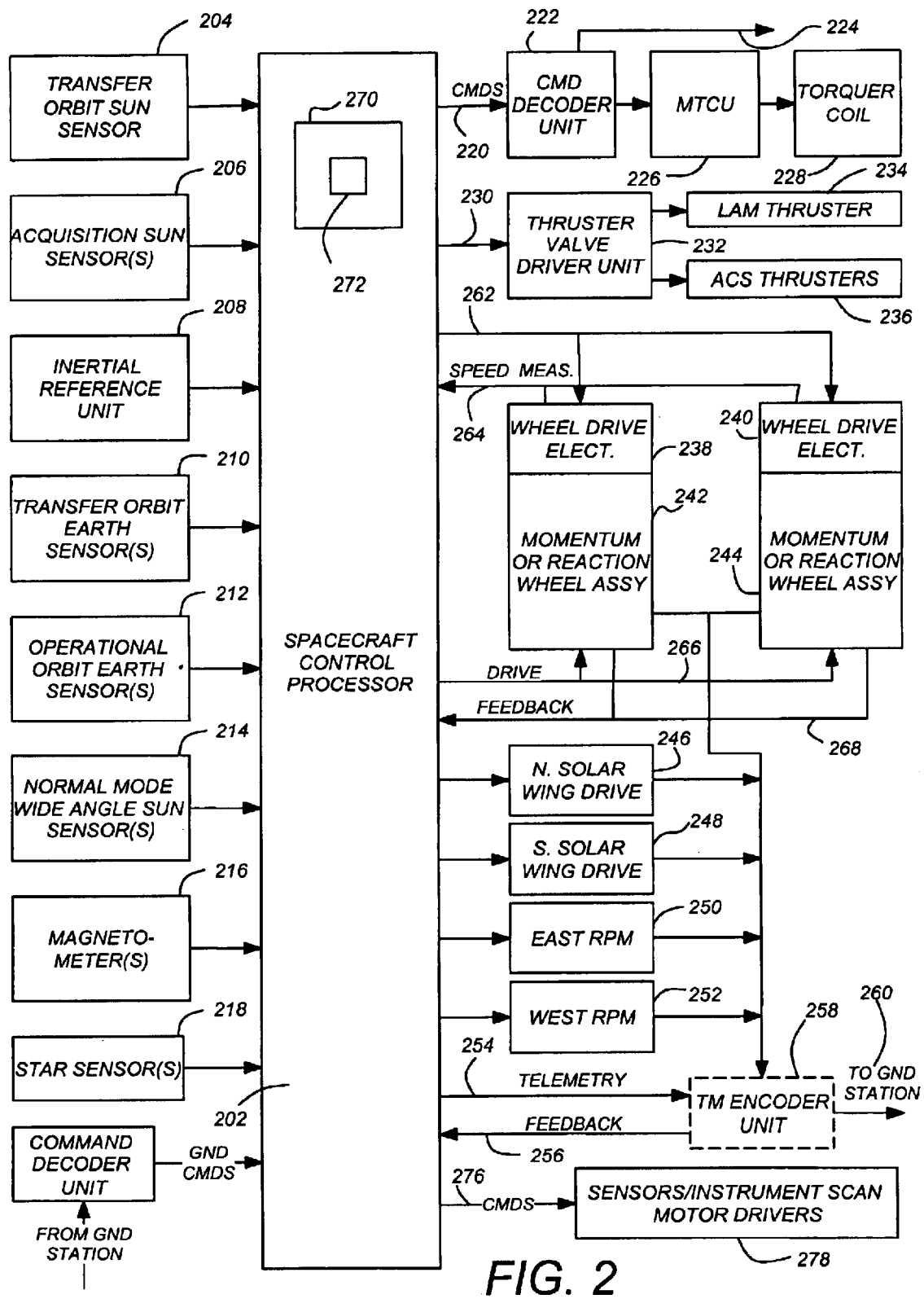
FIG. 2 is a diagram of an exemplary satellite attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal mode. The normal mode control could include attitude estimation, attitude and solar array steering, momentum bias control, magnetic torquing, and thruster momentum dumping (H-dumping). The mechanism's mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218. Ground commands are also input into the spacecraft control processor. These commands determine the control functions of the processor and the scan patterns of some instruments and sensors.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thruster 234 and the attitude control thrusters 236.

Generally, the spacecraft 100 may use thrusters, momentum/reaction wheels, or a combination thereof to perform spacecraft 100 attitude control.

Wheel torque commands 262 are generated by the SCP 202 and are communicated to the wheel speed electronics 238 and 240. These effect changes in the wheel speeds for wheels in momentum/reaction wheel assemblies 242 and 244, respectively. The speed of the wheels is also measured and fed back to the SCP 202 by feedback control signal 264.

When momentum wheel assemblies are used, the spacecraft control processor also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260. The spacecraft typically includes 4 reaction wheels, disposed to permit that application of torques in any direction, and permitting for a backup torque wheel, however, different number of momentum wheels and momentum wheels of other design may be used. For the sake of simplification, the momentum wheel(s) will be alternatively referred to as momentum wheel(s) 242 hereinafter.

For some satellites, the spacecraft control processor 202 also commands the scan motions of various sensors and instruments. The scan timings and patterns generated by the SCP 202 are communicated to the scan motor drivers 278.

The SCP 202 also provides commands to the solar wing drives 246, 248, which manipulate solar wings 104N and 104S respectively. The solar wings 104N and 104S can be manipulated about the X axis and about the Y axis shown in FIG. 1. The SCP 202 can also step reflector positioning mechanisms (RPMs) 250 and 252 to adjust the antenna orientation. Modules 250 and 252 provide the mechanism positions to the TM encoder unit 258.

The SCP 202 also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
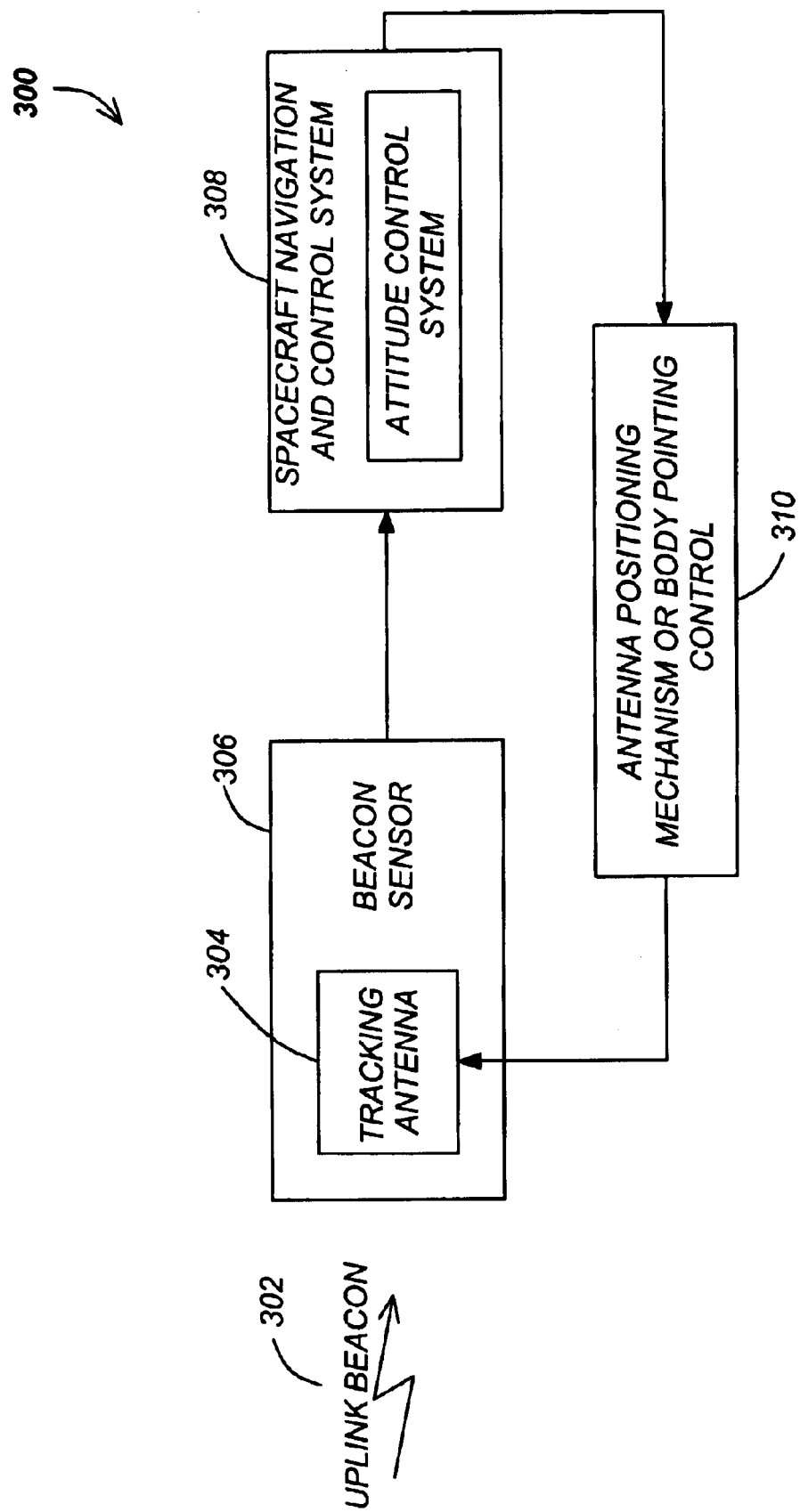
FIG. 3 is a diagram of an exemplary beacon tracking system.

FIG. 3 is a diagram of an exemplary prior art beacon tracking system 300. The beacon tracking system comprises feedback loop (which may be analog or digital) wherein an uplink beacon 302 is sensed by a beacon sensor 306 disposed on (or integral with) a tracking antenna 304. The beacon sensor 306 provides a signal proportional to the error pointing away from the uplink beacon to the spacecraft control system 308 to the tracking antenna 304, including errors from the spacecraft navigation and control system 308. The navigation and control system 308 then commands the antenna 304 and/or the spacecraft body (via control system 310) to point in a direction that accounts for the errors measured by the beacon sensor 306.

Typically, the beacon sensor 306 shares the antenna 304 with the payload system. Also, the beacon sensor 306 is tightly coupled to the antenna 304 position and is isolated from the thermal distortions of the spacecraft bus. When implemented properly, the beacon tracking system 300 can remove the impact of slowly varying dinural effects and orbital oscillations on pointing error.

The beacon tracking system 300 can also reduce yaw error because the spacecraft will yaw about the beacon site instead of the subsatellite point. Since the beacon tracking system 300 typically has better resolution than the earth sensors that are also used for satellite navigation, it also reduces noise.

Figure 4:
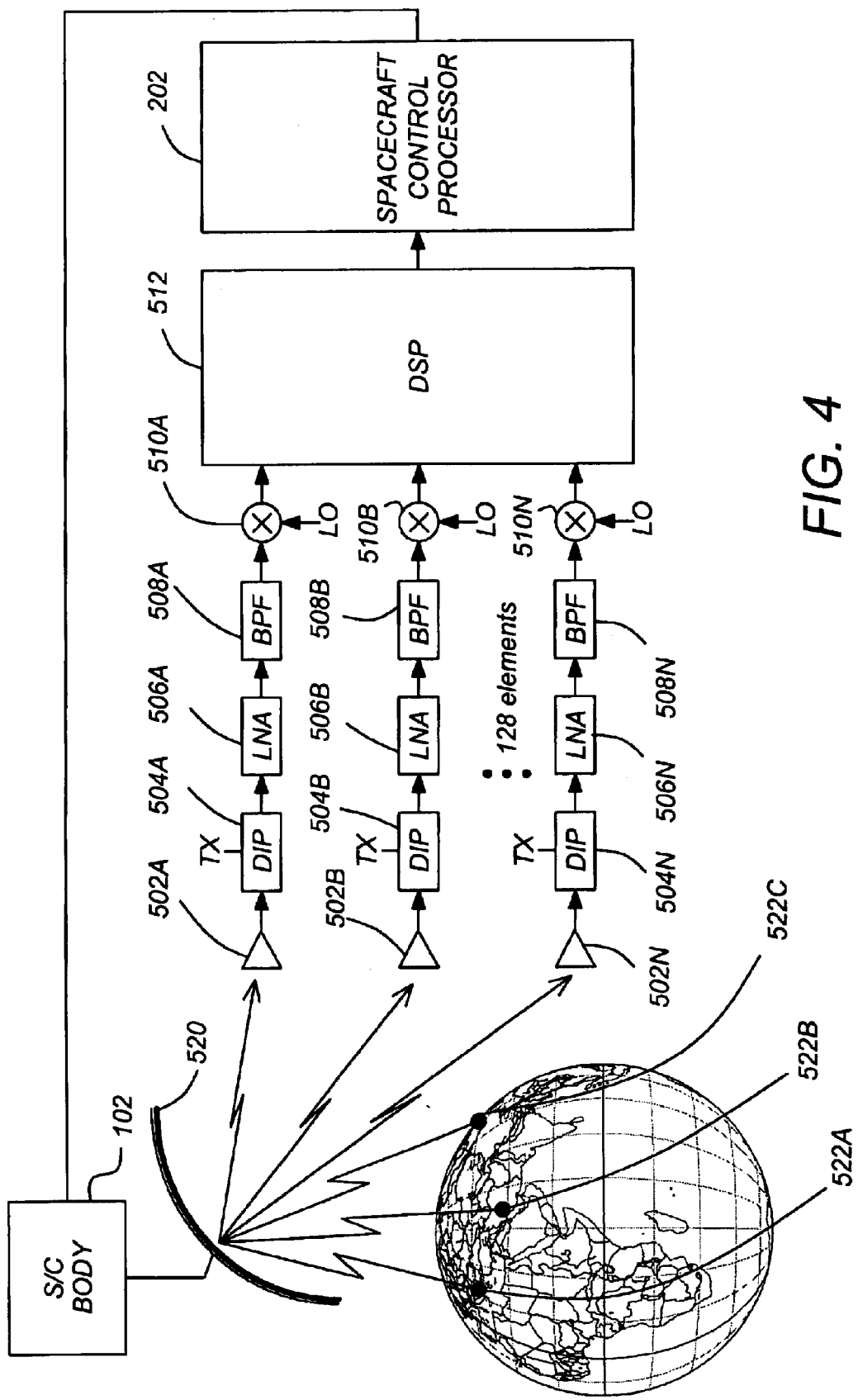
FIG. 4 is a diagram showing a digital beacon tracking system using digital beam forming technique.

FIG. 4 is a diagram showing a prior art digital beacon tracking system using digital beam-forming technique. One or more terrestrially based uplink beacon stations (UBSs) 522A–522C (hereinafter referred to alternatively as terrestrial beacons 522) transmit a signal which is reflected by an reflector 520 and sensed by N sensing feed elements 502A–502N. Each of the uplink beacon stations 522A–522C transmits a signal on a different "channel", distinguishable from the other "channels" by time division, code division, or frequency division multiplexing techniques. Where code division multiple access techniques are used, the uplink beacon stations 522A–522C transmit a unique pseudonormal (PN) coded signal.

Each of the feed outputs are provided to DiPlexers (DIPs) 504A–504N, thence to low noise amplifiers 506A–506N, bandpass filters 508A–508N, and L-band to intermediate frequency (L/IF) downconverters (D/C) 510A–510N. The downconverted IF signal is then provided to a digital signal processor (DSP) 512, which digitizes and channelizes the signals into sub-bands of a particular bandwidth. The DSP 512 also acquires the PN coded signals, despreads for bean magnitudes for each of the beams corresponding to the UBS 522. These beam magnitudes are provided to the SCP 202, which computes the azimuth and elevation angles corresponding to each UBS 522.

FIG. 6A is a diagram showing exemplary prior art tracking beam patterns from westerly and easterly oriented UBSs 522, showing signal magnitude contours as a function of elevation and azimuth angle away from the track null location.

FIG. 6B is a diagram showing exemplary tracking beam patterns from northerly and southerly oriented UBSs 522, showing signal magnitude contours as a function of elevation and azimuth angle away from the track null location.

Beacon Beamforming

The characteristics of the beacon beam can be shaped as, desired via the use of weighting factors applied to each of the feed elements 502–510 in paths A–N. The target (or desired) beacon beam pattern can be described according to $$B_t(az,\ el) = a\ \cos(b\sqrt{(az-az_0)^2 + (el-ei_0)^2})^c \qquad \text{Eq. 1}$$

where $B_t(az,el)>0$ is the desired magnitude (or directivity) of the beacon beam at look direction (az, el) measured with respect to a beacon sensor frame with null being directed along the line of sight (LOS) to the UBS; $a>0$ is the peak beam magnitude at the beam center $(az_0, el_0)$, also measured with respect to the beacon sensor frame; $b>0$ and $c>0$ together define the beamwidth of the beam and the beam slope.

Since the main lobe is of primary interest, we consider $-\pi/2 < b\ (az-az_0) < \pi/2$ and $-\pi/2 < b\ (el-el_0) < \pi/2$.

The directivity of the beacon beam is usually represented in $dB_i$. As shown by the plots in FIGS. 6A and 6B, a contour plot of the beacon beam described by the above equation is well approximated by a series of concentric circles. Although there may be multiple beacons with multiple beams per beacon, we focus on discussion of one beam.

Let $F_j(az,\ el)$ be the signal induced on the feed element j, for j=1 to 128, $k_j$ be the response of the RF electronics associated with the feed element j, j=1 to 128 ($k_j$ is typically temperature dependent). Let $X_j = F_j k_j$ be the response of the compound effects of feed element and RF electronics (feed chain, in short) of channel j, j=1~128. X is the array signal vector inputted to the DSP 512.

Figure 5A:
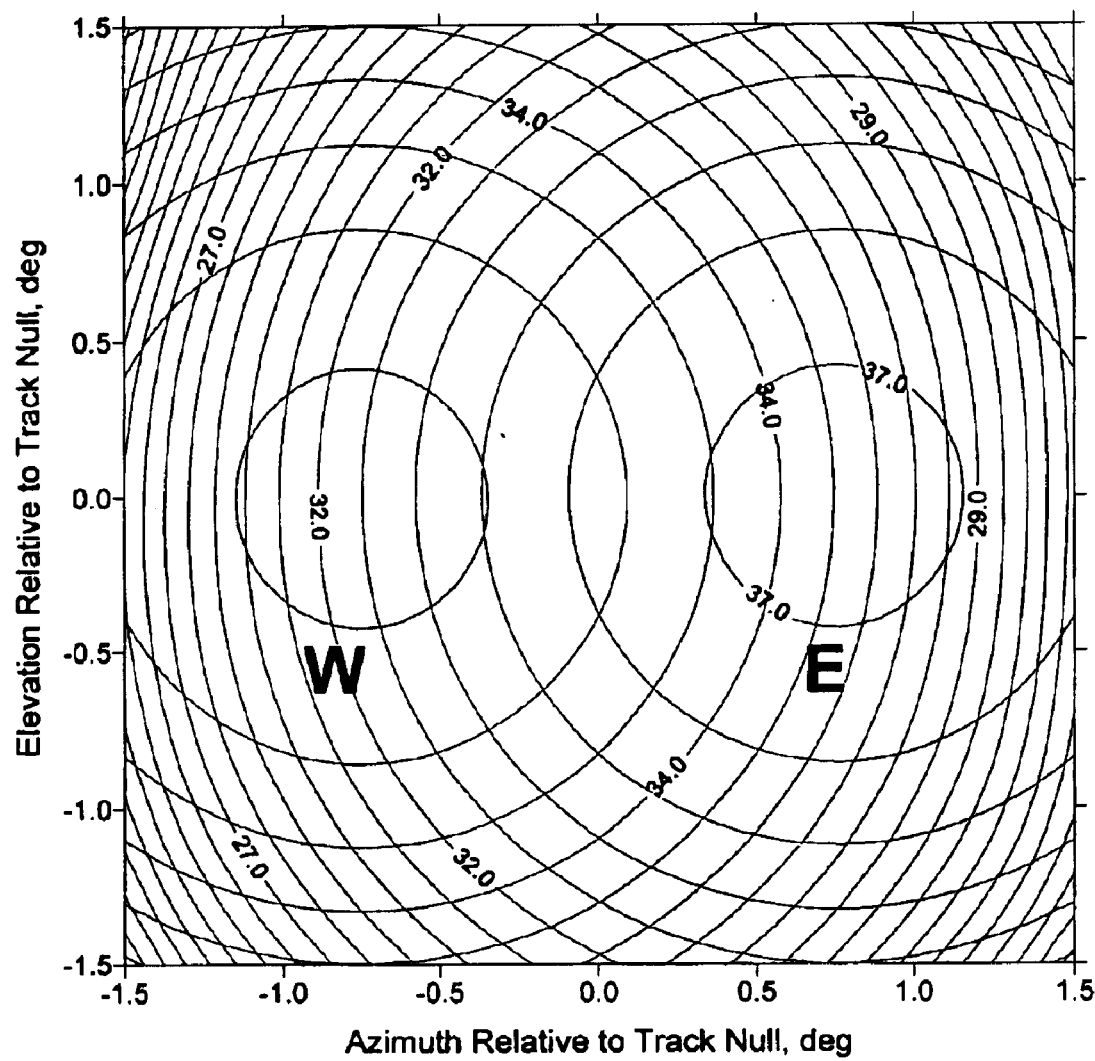
FIGS. 5A–5B are diagrams showing exemplary tracking beam patterns for westerly and easterly, and northerly and southerly oriented beacon stations, respectively.
Figure 5B:
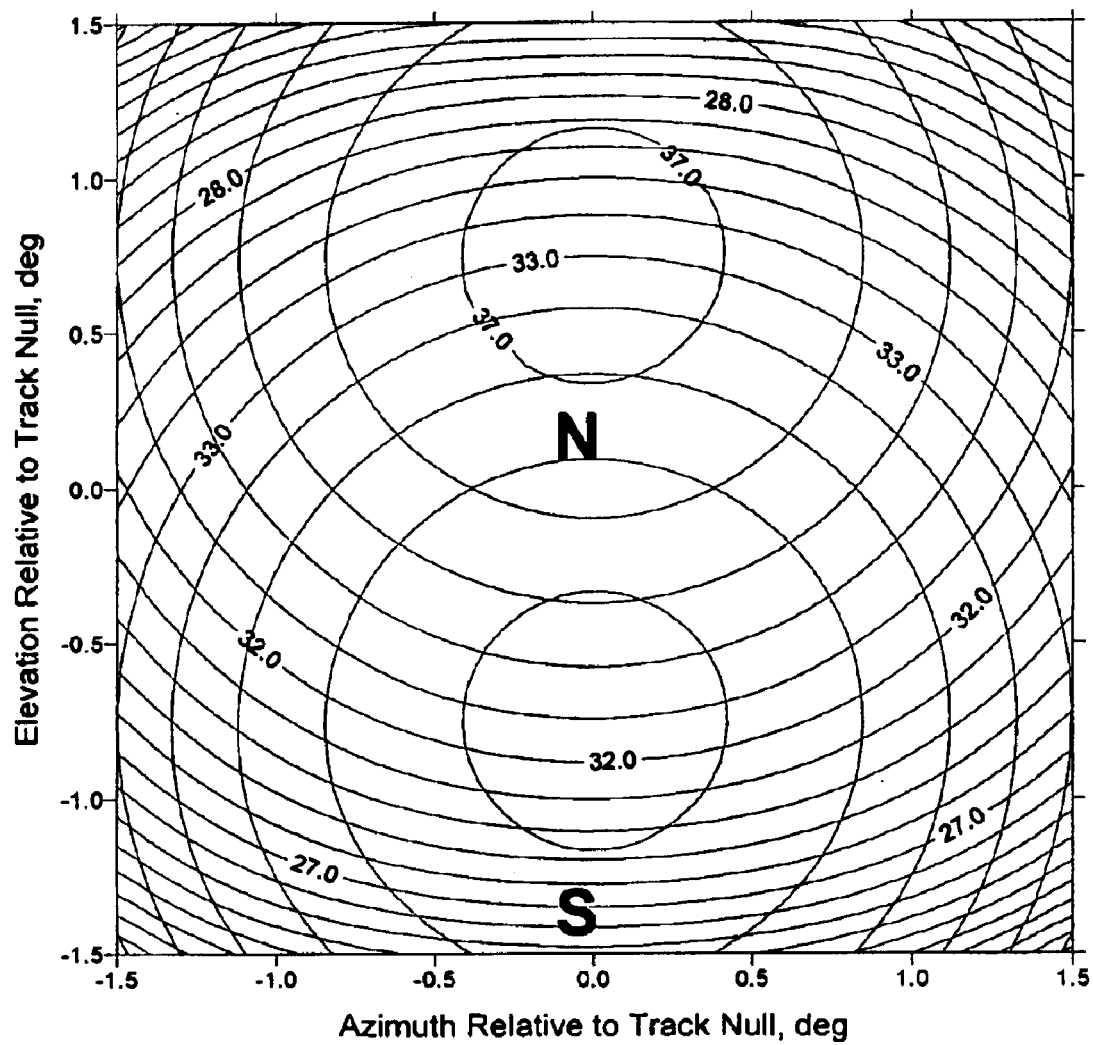

For a feed array antenna with n feed elements (n=128 in FIG. 5), the target (or desired) beacon beam pattern can be approximated by a weighted linear combination of the array input signals X to the DSP 512. The accuracy of the approximation largely depends on the number of feed elements and the approximation scheme. Once the array weight vector has been determined (using, for example, the techniques described below), the DSP formed beam, B, is approximated by the following linear operation:

$$B_t(az,\ el) \cong B(az,\ el) = \sum_{j}^{128} W_j X_j = X^* W \qquad \text{Eq. 2}$$

where $X \in C^n$ (nx1vector with complex value for each element) is the array input vector; $W \in C^n$ is the array weight vector or beam weights (to be found by least mean square optimization later) to be uploaded from ground operation center to the DSP 512.

The weighting vector $W_j$ used to shape the beam can be found by least mean square optimization off-line using nominal input $X_0$. Let $B_j = B_t(az_j, el_j)$ be calculated from the desired beam pattern equation, where the $(az_j, el_j)$ are points within the interested region of the beacon beam.

Let $X_{0,j} = X_0(az_j, el_j)$ be the nominal array input vector computed using nominal response of the feed chains under nominal temperature, and reflector and feed array geometry. By judicious choice of the interested points $(az_j, el_j)$, we have the following m equations:

$$B_{t,j} = X_{0,j}^T W \text{ for } j=1:m > n$$

$$B_{t,j} = X_{0,j}^T W \text{ for } j = 1:m > n$$

$$\text{Let } Y = \begin{bmatrix} B_{t,1} \\ \vdots \\ B_{t,m} \end{bmatrix} \text{ and } A = \begin{bmatrix} X_{0,1}^T \\ \vdots \\ X_{0,m}^T \end{bmatrix},$$

we have Y=AW. By use of least mean square optimization techniques, we can find the optimal beam weights as $$W = (A^*A)^{-1} A^* Y \qquad \text{Eq. 3}$$

for beamforming by the DSP 512, $B(az, el) = W^T X$. Typically only a couple of dozen of the 128 feed elements have significant beam weights associated with each formed beam.

Four beacon beams are formed according to the above linear combination with respect to each of the three beacons. Assume that:

(1) the spacecraft is in a zero inclination orbit (e.g. in the plane formed by the Equator), (2) the UBS is at $(az_b, el_b)$ from the orbit reference frame (z-axis Nadir and y-axis South). (3) the East beam center, E(az, el), is located at $(az_b - az_0, el_b)$, the West beam center, W(az, el), is located at $(az_b + az_0, el_b)$, the North beam center, N(az, el), is located at $(az_b, el_b+el_0)$, and the South beam center, S(az, el), is located at $(az_b, el_b-el_0)$, with all (az, el) measured from the orbit reference frame. Then, with all (az, el) measured with respect to the beacon sensor frame, four beams are formed for each beacon:

$E(az, el)=|B(az, el)|$ with beam center at $(az_0, 0)$,     Eq. 3A $W(az, el)=|B(az, el)|$ with beam center at $(-az_0, 0)$,     Eq. 3B $N(az, el)=|B(az, el)|$ with beam center at $(0, el_0)$,     Eq. 3C $S(az, el)=|B(az, el)|$ with beam center at $(0, -el_0)$,     Eq. 3D The beams so formed have errors as compared to the original desired beam shape due to finite number of array elements. The beacon sensor error due to this approximation error alone is sometimes called beacon beam pattern approximation error (assuming infinite precision of beam weightings W and perfect prediction of feed chain response). Potentially, with a perfect interpolation scheme (e.g., high order curve fitting or fine look-up table), we can recover (az, el) by given E/W/N/S beams to the extent of pattern approximation error.

The original (az, el) can be recovered in the beacon sensor frame from the E, W, N, and S beams, is by the following curve fitting approximation:

$$az_c = K_{az} \frac{E^2 - W^2}{E^2 + W^2}, \text{ and} \quad \text{Eq. 4A}$$

$$el_c = K_{el} \frac{N^2 - S^2}{N^2 + S^2} \quad \text{Eq. 4B}$$

This approximation error as compared to a perfect curve fitting is called beacon angle approximation error. The beacon asymmetry error is the combination of beam pattern approximation error and the beacon angle approximation error. The beacon asymmetry error is $az-az_c$ and $el-el_c$ in azimuth and elevation, respectively. The computation of the beacon asymmetry error as described above and its compensation by equivalent beacon bias angles is an important part of this invention. The slopes $K_{az}$ and $K_{el}$ can be found by least square optimization similar to the above procedure by collecting m interested (az, el) pairs:

$$\begin{bmatrix} az_1 \\ el_1 \\ \vdots \\ az_m \\ el_m \end{bmatrix} = \begin{bmatrix} \frac{E_1^2 - W_1^2}{E_1^2 + W_1^2} & 0 \\ 0 & \frac{N_1^2 - S_1^2}{N_1^2 + S_1^2} \\ \vdots & \vdots \\ \frac{E_m^2 - W_m^2}{E_m^2 + W_m^2} & 0 \\ 0 & \frac{N_m^2 - S_m^2}{N_m^2 + S_m^2} \end{bmatrix} \begin{bmatrix} K_{az} \\ K_{el} \end{bmatrix} \quad \text{Eq. 5}$$

Beacon Asymmetry Error Compensation

The major beacon error sources by linear beam-forming is: (1) beacon asymmetry error, which is the combination of the beacon angle approximation error and the beam pattern approximation error due to finite number of feed elements; (2) uncertain geometry between feed array, reflector and calibration probe after deployment and under thermal deformation, and the RF electronics gain variation due to diurnal temperature variation. These errors an be reduced by suitable calibration; and (3) quantization error due to the finite bits representation of the beam weights. The major portion of error sources (1) and (3) behave like biases, and can be compensated by uploading corresponding bias angles to the beacon sensor processing software.

The beam asymmetry error consists of dominate biases (DC) component(s) which can be compensated by uploading equivalent beacon bias angles, and an excursion (AC) component(s) when the ground station traverses through the beacon FOV.

Given a pair of known (az el), the predicted beam magnitudes can be computed using Eqs. 3A, 3B, 3C and 3D, and the predicted beacon angle ($az_c$ $el_c$) can be computed using Eq. 4A and 4B. The beacon asymmetry error can be computed as $az-az_c$ and $el-el_c$ in azimuth and elevation, respectively. Then the measured beacon ($az_m$ $el_m$) can be corrected by these beacon biases: $az_m-az_b$ and $el_m-el_b$, to compensate for the beacon asymmetry, where ($az_m$ $el_m$) are the measured beacon angles using measured E, W, S, N beam magnitudes and computed using Eq. 4A and 4B.

Beacon Calibration

The nominal value of the antenna response in each feed chain, $X_0(az, el)$, can be used to find the optimal beam weights W. This can be performed off-line. However, because the beam response is a function of the payload geometry, thermal deformation and electronics thermal drifting, periodic calibration of the feed chain response is desired to maintain beacon performance.

Assuming a calibration probe is placed at ($az_c$, $el_c$) which has response $X_c(az_c, el_c, k_c)$ with $k_c$ being thermal environment dependent. During a calibration period, all feed chains will be cycled through for calibration. Given nominal $X_{0j}$ ($az_c$, $el_c$) with nominal transfer function $k_j$ for the feed chain j, j=1 to 128, and calibrated (measured) $X_{cj}(az_c, el_c, k_{cj})$, we have $X_{cj}(az_c, el_c, k_{cj})=X_{0j}(az_c, el_c)k_{cj}$ for feed chain j, j=1 to 128, and $$k_{c,i} = \frac{X_{0,j}(az_c, el_c)^* X_{c,j}(az_c, el_c, k_{c,j})}{X_{0,j}(az_c, el_c)^* X_{0,j}(az_c, el_c)} \quad \text{Eq. 6}$$

In matrix format, the result is $X_c(az_c, el_c, k_c)=Diag(X_0(az_c, el_c))k_c$ and $k_c=Diag(X_0(az_c, el_c))^{-1}X_c(az_c, el_c, k_c)$     Eq. 7 where $k_c$ represents gain and phase change in the feed chain response.

The ($az_c$, $el_c$) depends on the orientation and location of both calibration probe and the feed array after deployment. The ($az_c$, $el_c$) may have large error after deployment and estimation of deployment error may be needed. If the average of the diurnal temperature is close to the nominal temperature and the average of the diurnal $k_c$ is close to the nominal gain function, the averaging of $X_c(az_c, el_c, k_c)$ over a typical day (or days) is a good estimate of $X_0(az_c, el_c)$, and new estimate $X_0(az_c, el_c)$ can be used to calculate new ($az_c$, $el_c$).

After obtaining good estimate of ($az_c$, $el_c$), the $k_c$ by calibration at look angle ($az_c$, $el_c$) is a good estimate for that at look angle (az, el). Therefore, the estimate of the feed chain response is $X_c(az, el, k_c)=Diag(X(az, el))k_c$     Eq. 8

It is desirable to maintain the formed beams regardless to the change in the response of the feed chains:

$$B(az, el) = W^T X_0(az, el) = W_c^T X_c(az, el, k_c) \quad \text{Eq. 9}$$

This can be achieved by simply selecting $W_c$ according to Equation B below:

$$W_c = Diag(X_c(az, el, k_c))^{-1} Diag(X_0(az, el)) W = Diag(K_c)^{-1} W \quad \text{Eq. 10}$$

It is desirable to reduce the beam weights the same amount the channel gain has increased to maintain the formed beams. These new beam weights are calculated per equation above by AOC and uploaded to spacecraft every calibration interval.

Beacon Beam Forming Weight Quantization Compensation

Using the foregoing, the beacon beam pattern immediately after a calibration update can be defined as:

$$B(az, el) = W_c^T X(az, el, k) \quad \text{Eq. 11}$$

where $W_c$ is the beam weights after the gain scaling per calibration, and X(az, el, k) is the true but unknown feed chain response. The introduction of $W_c$ has statistically reduced the beam-forming error by the periodic calibration of the RF channels (k is the gain after each calibration). $W_c$ is typically implemented in the DSP 512. Unfortunately, $W_c$ and X must therefore be represented with a finite number of bits (typically 8 bits). This finite-bit representation of $W_c$ and X in DSP 512, is responsible for a quantization error that significantly negatively affects the beacon beam-forming precision.

For purposes of notational simplicity, let B=B(az, el), W=$W_c$, and X=X(az, el, k) (note that theses notations now have different meaning than that in previous section). Let the beacon beam-forming be rewritten as B=$W_{hu}{}_T^T$X (unquantized version), and let the DSP 512 quantized version be $\tilde{B}=\tilde{W}^T\tilde{X}$. Using this notation, the beam quantization error can be computed as:

$$\Delta B = B - \tilde{B} = W^T X - \tilde{W}^T \tilde{X} = (W - \tilde{W})^T X + \tilde{W}^T (X - \tilde{X}) \quad \text{Eq. 12}$$

The first part, $(W-\tilde{W})^T X$, behaves like biases (DC component), and the second part, $W^T(X-\tilde{X})$, like time-varying (AC component). Since X and W has comparable resolution and may have different bit lengths, the errors W−$\tilde{W}$ and X−$\tilde{X}$ are approximately equal. Furthermore, since $|X| >> |\tilde{W}|$, the beam quantization error $\Delta B$ is dominated by the quantization error of the beam weights quantization, (DC component). Therefore, $$\Delta B = B - \tilde{B} \approx (W - \tilde{W})^T X \quad \text{Eq. 13}$$

Assuming that the RF electronics channel calibration error and DSP quantization error are statistically independent, beam error can be statistically reduced by uploading and adding $\Delta B$ to the quantized beam (together with the new beam weights).

In fact, any known errors, such as asymmetry error and slow varying thermal deformation error, can be compensated this way provided their effects on the beam can be predicted, and the plant response (here, X), can be estimated.

Here, the plant comprises a number of feed chains 502A–510A, 502B–510B, . . . , 502N–510N. Each feed chain 502–510 can be calibrated every T minutes. In one embodiment, the feed chains are calibrated every 15 minutes. Immediately following the calibration of an feed chain, the best estimate of the response of the feed chain at calibration instant $t_c$. However, the feed chain responses suffer from calibration error, further temperature variation, the UBS apparent motion (which is time dependent) and spacecraft pointing error, i.e., X=X(az(t), el(t), k(t)) for all time t in [$t_c$, $t_c$+T]. Therefore, the prediction of quantization error using a representative feed chain (502–510 A–N) response is compromised (in error) by:

$$X_a = X_0(az, el)|_{tc} \, k_c|_{tc} \quad \text{Eq. 14}$$

Similarly, the quantization error for each of the four beacon beam is approximated by:

$$\Delta B_a \approx (W - \tilde{W})^T X_a \quad \text{Eq. 15}$$

The additional approximation error is:

$$\Delta B - \Delta B_a = (W - \tilde{W})^T (X - X_a) \quad \text{Eq. 16}$$

Just how good the approximation $\Delta B_a$ is to $\Delta B$ depends on how close the $X_a$ to X. The error between X and $X_a$ depends on the UBS apparent motion (typically in the order of±0.01°), calibration error, and temperature variation between adjacent calibration periods. As long as (X−$X_a$) is much smaller than the X in magnitude, the approximate quantization correction above is effective. For spacecraft without inclination, the quantization estimation will be even more effective.

Let $\Delta E$, $\Delta W$ $\Delta N$, and $\Delta S$ be the beam errors (or biases) for E, W, N, and S beams, respectively. (Note that W before this point has been used to stand for "beam Weight", while from this point on stand for "West beam"). These beam biases can be uploaded to the beacon sensor processing software via DSP 512 for the correction of each beam. In some implementations, upload of beacon biases, but not beam biases are permitted.

Applying azimuth angle curve-fitting using the above beam biases provides:

$$az = K_{az} \frac{E^2 - W^2}{E^2 + W^2} \approx K_{az} \frac{(\tilde{E}+\Delta E)^2 - (\tilde{W}+\Delta W)^2}{(\tilde{E}+\Delta E)^2 + (\tilde{W}+\Delta W)^2} \cong \\ K_{az} \frac{(\tilde{E})^2 - (\tilde{W})^2}{(\tilde{E})^2 + (\tilde{W})^2} + K_{az} \frac{2(\tilde{E}\Delta E) - 2(\tilde{W}\Delta W)}{(\tilde{E})^2 + (\tilde{W})^2} \quad \text{Eq. 18}$$

Elevation angle curve fitting can be accomplished analogously.

The first term on the right hand side, $$K_{az} \frac{(\tilde{E})^2 - (\tilde{W})^2}{(\tilde{E})^2 + (\tilde{W})^2},$$

contains the DSP 512 computed 4 beams and is the azimuth angle the beacon sensor processing software will normally calculate, the last term on the right hand side, $$K_{az} \frac{2(\tilde{E}\Delta E) - 2(\tilde{W}\Delta W)}{(\tilde{E})^2 + (\tilde{W})^2},$$

is the equivalent azimuth beacon error or correction needed due to quantization:

$$az_{bias} \approx K_{az} \frac{2(\tilde{E}\Delta E) - 2(\tilde{W}\Delta W)}{(\tilde{E})^2 + (\tilde{W})^2}, \quad \text{Eq. 19}$$

The equivalent elevation beacon error or correction needed due to quantization can be expressed as $$el_{bias} \approx K_{el} \frac{2(\tilde{N}\Delta N) - 2(\tilde{S}\Delta S)}{(\tilde{N})^2 + (\tilde{S})^2}, \quad \text{Eq. 20}$$

Since the E, W, N, S are time-varying during each calibration period, let $\tilde{E} = \tilde{E}_{DC} + \tilde{E}_{AC}$ and $\tilde{W} = \tilde{W}_{DC} + \tilde{W}_{AC}$ where $E_{DC} = E_0(az, el)|_{tc} + T/2 k_c|_{tc}$, and  Eq. 20A $W_{DC} = W_0(az, el)|_{tc} + T/2 k_c|_{tc}$  Eq. 20B Let $az_{DC} + az_{AC} \approx$  Eq. 21

$$K_{az} \frac{2(\tilde{E}_{DC}\Delta E) - 2(\tilde{W}_{DC}\Delta W)}{(\tilde{E})^2 + (\tilde{W})^2} + K_{az} \frac{2(\tilde{E}_{AC}\Delta E) - 2(\tilde{W}_{AC}\Delta W)}{(\tilde{E})^2 + (\tilde{W})^2},$$

and, $el_{DC} + el_{AC} \approx$  Eq. 22

$$K_{el} \frac{2(\tilde{N}_{DC}\Delta N) - 2(\tilde{S}_{DC}\Delta S)}{(\tilde{N})^2 + (\tilde{S})^2} + K_{el} \frac{2(\tilde{N}_{AC}\Delta N) - 2(\tilde{S}_{AC}\Delta S)}{(\tilde{N})^2 + (\tilde{S})^2},$$

The effect of adding beam bias to each beam can be considered as adding a DC and an AC beacon error compensation components. The DC component has the equivalent effect of shifting the beacon null and the AC component changing the curve-fitting slope. Note that these beam biases are different from pure null bias, these biases are tailored for the feed chain response for the specific calibration period, and may not necessarily zero the null bias at the same time. For beam biases correction, 4 elements (E, W, N and S) per beacon are required for correcting the beam-forming quantization error. For beacon biases correction, only the 2 DC elements (Az and El) are required. The current GEM implementation can only accommodate the 2 elements beacon biases upload with software changes.

Figure 6:
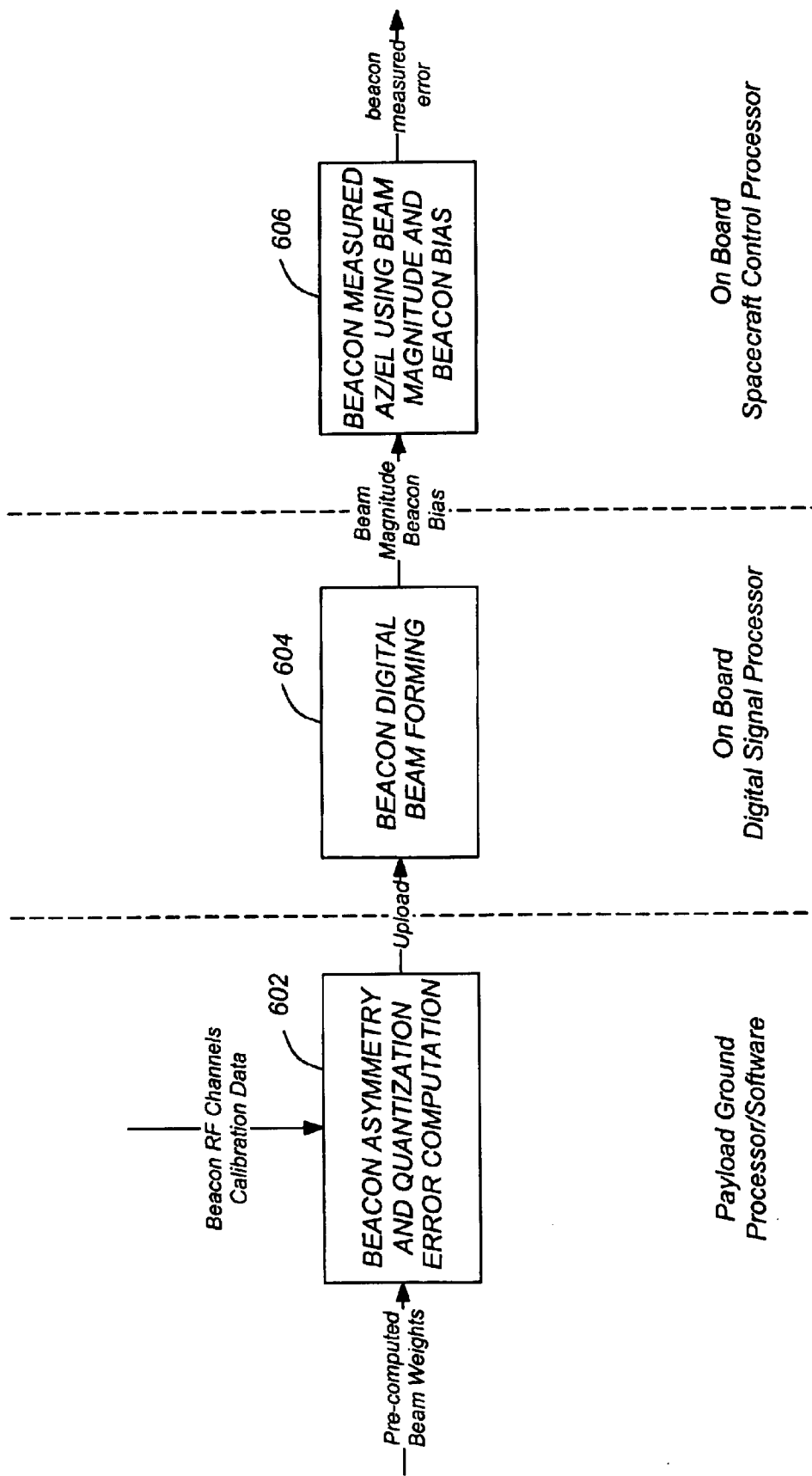
FIG. 6 is a diagram illustrating an exemplary implementation of the digital beacon asymmetry and quantization compensation.

FIG. 6 is a block diagram illustrating an exemplary implementation of the digital beacon asymmetry and quantization compensation. Precomputed beam weights and beacon RF channel calibration data is used to compute the beacon asymmetry and quantization error compensation, as shown in block 602. The results of this computation are then uploaded to a digital processor (e.g. 512) on board the satellite 100, which computes beam magnitude beacon bias as shown in block 604, and provides this information to the SCP 202, which computes the beacon measured error, as shown in block 606.

Figure 7:
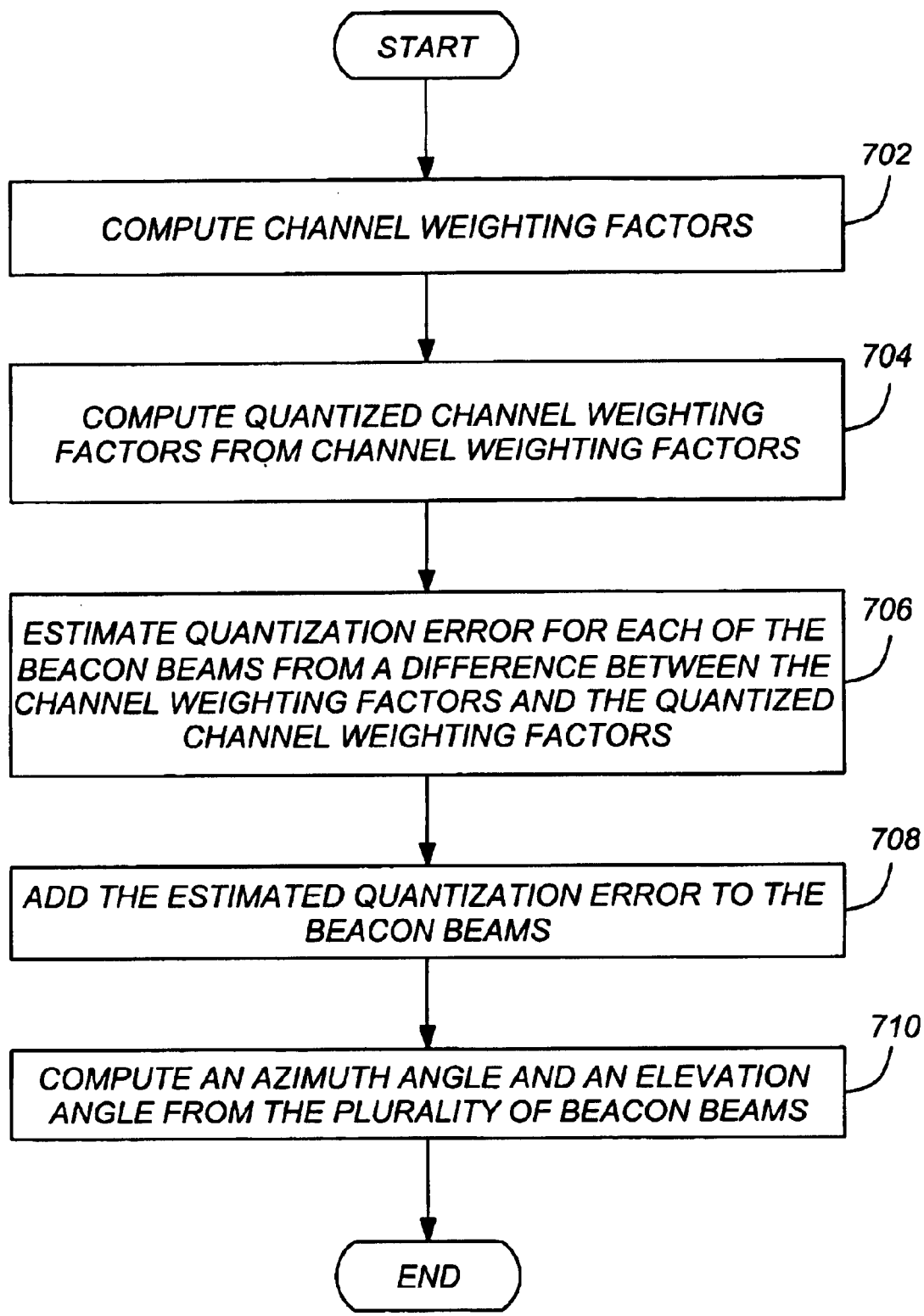
FIG. 7 is a flow chart depicting exemplary operations that can be used to practice one embodiment of the present invention.

FIG. 7 is a diagram illustrating a summary of exemplary method steps that can be used to practice one embodiment of the present invention. In block 702, channel 502–508 A–N weighting factors are computed. This can be accomplished, for example, using the techniques described in connection with equations 2 and 3 above. If desired, any changes in the response of the elements of the channels 502–508 A–N can be accounted for using calibrated values for the channel weights, using, for example, the techniques described in connection with equations 6 through 10.

In block 704, quantized channel weighting factors are computed from the channel weighting factors and the bit quantization of the channel path. This can be accomplished as $$\frac{W}{2^n}$$

wherein n is the bit resolution of the channel.

In block 706, the estimated quantization error is added to the beacon beams. In one embodiment, this is accomplished by estimating a channel response $X_2$ for at least some of the channels computing the quantization error $\Delta B_a$ from the channel response, for example, as described in equations 14 and 15.

In block 708, an azimuth angle and an elevation angle are computed from the plurality of beacon beams. These operations can be accomplished as described above in connection with equations 18–20.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of reducing the quantization error in a plurality of beacon beams wherein each beacon beam is digitally formed using a plurality of channels, comprising the steps of:

(a) computing quantized channels weights $\tilde{W}_c$ from channel weights $W_c$ for at least some of the channels;

(b) estimating the quantization error $\Delta B_a$ for each of the beacon beams from a difference between the channel weights $W_c$ and the computed quantized channel weights $\tilde{W}_c$; and (c) adding the estimated quantization error $\Delta B_a$ to the beacon beams.

2. The method of claim 1, wherein the beacon beam comprises a communication beam.

3. The method of claim 1, wherein steps (a)–(c) are performed in a terrestrial processor.

4. The method of claim 1, wherein steps (a)–(c) are performed in a satellite processor.

5. The method of claim 1, further comprising the step of: computing an azimuth bias angle $az_{bias}$ and an elevation bias angle $el_{bias}$ from the plurality of quantized beacon beams.

6. The method of claim 5, wherein the azimuth bias angle and elevation bias angle are computed according to $$az_{bias} \approx K_{az} \frac{2(\tilde{E}\Delta E) - 2(\tilde{W}\Delta W)}{(\tilde{E})^2 + (\tilde{W})^2},$$

$$el_{bias} \approx K_{el} \frac{2(\tilde{N}\Delta N) - 2(\tilde{S}\Delta S)}{(\tilde{N})^2 + (\tilde{S})^2}$$

wherein, $\tilde{N}, \tilde{S}, \tilde{E}, \tilde{W}$ are predicted beam magnitudes for a North, South, East, and West beacon beams, respectively, and $\Delta N, \Delta S, \Delta E, \Delta W$ are estimated quantization errors $\Delta B_a$ for the North, South, East, and West beacon beams, respectively.

7. The method of claim 5, wherein the azimuth and elevation bias angles $az_{bias}$ and $el_{bias}$ are used to correct beacon measured angles for compensating the estimated quantization errors $\Delta B_a$.

8. The method of claim 1, wherein the step of adding the estimated quantization error $\Delta B_a$ to each of the beacon beams comprises the steps of:
   estimating a channel response $X_a$ for at least some of the channels; and
   computing the quantization error $\Delta B_a$ from the channel response.

9. The method of claim 8, wherein the quantization error $\Delta B_a$ is computed from the channel response according to $\Delta B_a \approx (W_c - \tilde{W}_c)^T X_a$.

10. The method of claim 8, wherein the channel response $X_a$ is estimated according to $X_a = X_0(az, el)|_{t_c} k_c|_{t_c}$, wherein $X_0(az, el)|_{t_c}$ is a nominal response of each channel at a calibration time $t_c$ and $k_c|_{t_c}$ is a thermal gain factor $k_c$ evaluated at a calibration time $t_c$.

11. The method of claim 10, further comprising the step of computing the thermal gain factor $k_c$.

12. The method of claim 11, wherein the step of computing the thermal gain factor $k_c$ comprises the steps of:
   computing $k_c = \text{Diag}(X_0(az_c, el_c))^{-1} X_c(az_c, el_c, k_c)$, wherein $(X_0(az_c, el_c))$ is the nominal value of the channel to a calibration probe placed at a location $(az_c, el_c)$ and $X_c(az_c, el_c, k_c)$ is the response of each channel to a calibration probe placed at the location $(az_c, el_c)$.

13. The method of claim 1, further comprising the step of computing the channel weights $W_t$ according to:
   $W_c = \text{Diag}(X_c(az, el, k_c))^{-1} \text{Diag}(X_0(az, el,)) W = \text{Diag}(K_c)^{-1} W$, wherein W represents nominal channel weights.

14. An apparatus for reducing the quantization error in a plurality of beacon beams wherein each beacon beam is digitally formed using a plurality of channels comprising:
   means for computing quantized channel weights $\tilde{W}_c$ from channel weights $W_c$ for at least some of the channels;
   means for estimating the quantization error $\Delta B_a$ for each of the beacon beams from a difference between the channel weights $W_c$ and the computed quantized channel weights $\tilde{W}_c$; and
   means for adding the estimated quantization error $\Delta B_a$ to the beacon beams.

15. The apparatus of claim 14, wherein the beacon beam comprises a communication beam.

16. The apparatus of claim 14, wherein the means for computing quantized channel weights $\tilde{W}_c$ from channel weights $W_c$ for at least some of the channels, means for estimating the quantization error $\Delta B_a$ for each of the beacon beams from a difference between the channel weights $W_c$ and the computed quantized channel weights $\tilde{W}_c$; and means for adding the estimated quantization error $\Delta B_a$ to the beacon beams comprises a terrestrial processor.

17. The apparatus of claim 14, wherein the means for computing quantized channel weights $\tilde{W}_c$ from channel weights $W_c$ for at least some of the channels, means for estimating the quantization error $\Delta B_a$ for each of the beacon beams from a difference between the channel weights $W_c$ and the computed quantized channel weights $\tilde{W}_c$; and means for adding the estimated quantization error $\Delta B_a$ to the beacon beams comprises a satellite processor.

18. The apparatus of claim 14, further comprising:
   means for computing an azimuth bias angle $az_{bias}$ and an elevation bias angle $el_{bias}$ from the plurality of quantized beacon beams.

19. The apparatus of claim 18, wherein the azimuth bias angle and elevation bias angle are computed according to $$az_{bias} \approx K_{ac} \frac{2(\tilde{E}\Delta E) - 2(\tilde{W}\Delta W)}{(\tilde{E})^2 + (\tilde{W})^2}, \quad el_{bias} \approx K_{el} \frac{2(\tilde{N}\Delta N) - 2(\tilde{S}\Delta S)}{(\tilde{N})^2 + (\tilde{S})^2}$$

wherein $\tilde{N}, \tilde{S}, \tilde{E}, \tilde{W}$ are predicted beam magnitudes for a North, South, East, and West beacon beams, respectively, and $\Delta N, \Delta S, \Delta E, \Delta W$ are estimated quantization errors $\Delta B_a$ for the North, South, East, and West beacon beams, respectively.

20. The apparatus of claim 18, wherein the azimuth and elevation bias angles $az_{bias}$ and $el_{bias}$ are used to correct beacon measured angles for compensating the estimated quantization errors $\Delta B_a$.

21. The apparatus of claim 14, wherein the means for adding the estimated quantization error $\Delta B_a$ to each of the beacon beams comprises:
   means for estimating a channel response $X_a$ for at least some of the channels; and
   means for computing the quantization error $\Delta B_a$ from the channel response.

22. The apparatus of claim 21, wherein the quantization error $\Delta B_a$ is computed from the channel response according to $\Delta B_a \approx (W_a - \tilde{W}_c)^T X_a$.

23. The apparatus of claim 21, wherein the channel response $X_a$ is estimated according to $X_a = X_0(az, el)|_{t_c} k_c|_{t_c}$, wherein $X_0(az, el)|_{t_c}$ is a nominal response of each channel at a calibration time $t_c$ and $k_c|_{t_c}$ is a thermal gain factor $k_c$ evaluated at a calibration time $t_c$.

24. The apparatus of claim 23, further comprising means for computing the thermal gain factor $k_c$.

25. The apparatus of claim 24, wherein the means for computing the thermal gain factor $k_c$ comprises:
   means for computing $k_c = \text{Diag}(X_0(az_c, el_c))^{-1} X_c(az_c, el_c, k_c)$, wherein $(X_0(az_c, el_c))$ is the nominal value of the channel to a calibration probe placed at a location $(az_c, el_c)$ and $X_0(az_c, el_c, k_c)$ is the response of each channel to a calibration probe placed at the location $(az_c, el_c)$.

26. The apparatus of claim 25, further comprising means for computing the channel weights $W_t$ according to:
   $W_c = \text{Diag}(X_c(az, el, k_c))^{-1} \text{Diag}(X_0(az, el)) W = \text{Diag}(K_c)^{-1} W$, wherein W represents nominal channel weights.

* * * * *